United States Patent
Peng et al.

(10) Patent No.: US 10,837,900 B2
(45) Date of Patent: Nov. 17, 2020

(54) METHOD FOR DETECTING NOTOGINSENG USING TERAHERTZ TECHNOLOGY

(71) Applicant: University of Shanghai for Science and Technology, Shanghai (CN)

(72) Inventors: Yan Peng, Shanghai (CN); Yiming Zhu, Shanghai (CN); Tianyi Kou, Shanghai (CN); Zhaozhao Sun, Shanghai (CN); Haicheng Xiao, Shanghai (CN); Chenjun Shi, Shanghai (CN); Liping Wang, Shanghai (CN); Songlin Zhuang, Shanghai (CN)

(73) Assignee: University of Shanghai for Science and Technology, Shanghai (CN)

( * ) Notice: Subject to any disclaimer, the term of this patent is extended or adjusted under 35 U.S.C. 154(b) by 0 days.

(21) Appl. No.: 16/388,480

(22) Filed: Apr. 18, 2019

(65) Prior Publication Data
US 2019/0323956 A1 Oct. 24, 2019

(30) Foreign Application Priority Data
Apr. 18, 2018 (CN) .......................... 2018 1 0349626

(51) Int. Cl.
*G01N 21/3563* (2014.01)
*G01N 21/3586* (2014.01)

(52) U.S. Cl.
CPC ..... *G01N 21/3563* (2013.01); *G01N 21/3586* (2013.01)

(58) Field of Classification Search
CPC ........... G01N 21/3581; G01N 21/3586; G01N 21/3563; G01N 2021/3572
See application file for complete search history.

(56) References Cited

U.S. PATENT DOCUMENTS

2010/0108887 A1* 5/2010 Ogawa ............... G01N 21/3563
250/339.08

FOREIGN PATENT DOCUMENTS

| CN | 103308473 A | * | 9/2013 | |
| WO | WO-2019010979 A1 | * | 1/2019 | ......... G01N 21/3586 |

OTHER PUBLICATIONS

Zhao et al., "Terahertz spectroscopic investigation of Chinese herbal medicine", 3rd International Photonics & OptoElectronics Meetings (POEM 2010), Journal of Physics: Conference Series, (2011), vol. 276, pp. 1-4. (Year: 2011).*

* cited by examiner

*Primary Examiner* — Chih-Cheng Kao
(74) *Attorney, Agent, or Firm* — Wayne & Ken, LLC; Tony Hom

(57) ABSTRACT

A method for detecting notoginseng using terahertz technology. The notoginseng samples are pulverized in pulverizer. The pulverized samples are mixed with polyethylene powder in the ratio of 1:4 to 1:6. The powder mixture is pressed in a tablet press to obtain notoginseng tablet. Terahertz spectrograph is started. A peak is saved, and a background signal is measured. The time-domain graph of the background without sample is acquired. The time-domain graphs of the notoginseng tablets are acquired. The time-domain graphs are transformed into frequency-domain graphs by Fourier transform. The frequency-domain graphs are converted to obtain absorption spectrum of the notoginseng tablets. The absorption peak position of test tablet is compared with that of standard tablet to determine its authenticity. The concentration of key active substances of the notoginseng test sample is quantitatively analyzed by integrating the area under absorption peak curve of the notoginseng test sample.

2 Claims, 5 Drawing Sheets

METHOD FOR DETECTING NOTOGINSENG USING TERAHERTZ TECHNOLOGY

CROSS-REFERENCE TO RELATED APPLICATIONS

This application claims the benefit of priority from Chinese Patent Application No. CN 201810349626.1, filed on Apr. 18, 2018. The content of the aforementioned application, including any intervening amendments thereto, is incorporated herein by reference in its entirety.

TECHNICAL FIELD

The present disclosure relates to detection of medicines, and in particular to a method for detecting notoginseng using a terahertz technology.

BACKGROUND

Notoginseng is an age-old and precious medicinal plant. It is effective in dissipating blood stasis, stopping bleeding, detumescence and relieving pain. It is mainly applied to symptoms such as hemoptysis, hematemesis, epistaxis, hematochezia, metrorrhagia and metrostaxis, traumatic bleeding, chest and abdomen tingling and tumble swelling. The commercially available notoginseng has different efficacy due to differences in varieties, production sites and preparation conditions. Therefore, before the notoginseng medicine are released into the market, it is necessary to pre-test, classify and certify the key components of the notoginseng medicine.

At present, there are mainly three methods of detecting notoginseng: macroscopical identification, microscopic identification and physicochemical identification.

Macroscopical identification is to identify the authenticity and quality of medicinal materials by distinguishing the characteristics such as shape, size, color, texture, odor, surface and fracture surface characteristics, and the characteristics in water test and fire test. It is the simplest, quickest identification method. However, this method is only suitable for the identification of medicinal materials with normal morphology. When the medicinal material is processed into pieces or powders, the identification of such a method is no longer valid.

Microscopic identification is a method utilizing microscopic techniques to analyze and identify the structure, cell morphology and concentrations of medicinal materials. It is suitable for the identification of medicinal materials with incomplete morphology, and broken or powdered medicinal materials as well as Chinese medicines. Microscopic identification is especially useful for the identification of powdered medicinal materials. The microscopic identification only requires a simple apparatus and a low dosage of sample and has a fast identification speed as compared with the physicochemical identification and molecular identification. However, there are still some deficiencies, for example, microscopic characteristics of the medicinal materials with the same genus are similar and difficult to be distinguished.

Physicochemical identification refers to an identification method utilizing physical, chemical methods or instrumental analysis to analyze the characteristic chemical components of the medicinal materials. The main approaches such as spectroscopy, chromatography, color-test, fluorescence reaction, micro-sublimation, precipitation and spectrophotometry are currently used. However, these methods are time-consuming.

In addition, since the notoginseng medicinal materials, especially the notoginseng powder, no longer have its original morphological characteristics, the market appeared many kinds of fake notoginseng powders that were made of other species of the same genus or powder adulterants such as rice, potatoes, wheat, millet or soybean, which affect the curative effect and safety in clinical and health application and also disturb the normal order of the medicinal materials markets.

SUMMARY OF THE INVENTION

In order to solve the above technical problems, the present invention provides a method for detecting notoginseng using terahertz technology. This method aims to solve the problem in the existing technologies that the process for detecting the authenticity and quality of notoginseng is complicated.

The present disclosure provides a method for detecting notoginseng using terahertz technology, including the following steps:

1) pulverizing a notoginseng standard sample and a notoginseng test sample separately in a pulverizer; then mixing the pulverized standard sample and the pulverized test sample respectively with a polyethylene powder with the same ratio of between 1:4 and 1:6 to obtain a standard powder mixture and a test powder mixture;

2) pressing the standard powder mixture and the test powder mixture separately into a tablet press to obtain a standard tablet and a test tablet for detection;

3) reducing the humidity in the sample chamber of a terahertz spectrograph to less than 3%; storing a peak position; and acquiring a time-domain graph of the background without sample;

4) placing the standard tablet and the test tablet on a sample holder successively; acquiring the time-domain graph of the standard tablet and the time-domain graph of the test tablet, respectively;

5) transforming the time-domain graphs into frequency-domain graphs by Fourier transform;

6) converting the frequency-domain graphs of the standard tablet, the test tablet into absorption spectra of the standard tablet and the test tablet by the following equation:

$$Ab = -\log\left(\frac{Sam}{Ref}\right);$$

where, Ab is the absorption spectrum data, Sam is the sample frequency-domain data of the standard tablet and the test tablet, and Ref is the reference frequency-domain data of the background;

7) repeating test to obtain multiple sets of absorption spectrum data of the test tablet; averaging the obtained multiple sets of the absorption spectrum data; using analysis software to draw the absorption spectral graphs of the standard sample tablet and the test sample tablet; comparing the absorption peak positions, which determine whether the sample is a real notoginseng.

8) after determining that the sample is the real notoginseng, quantitatively analyzing the concentration of key active substances of the test tablet by integrating the area under an absorption peak curve in the spectrum corresponding to the key active substances; wherein the area under the absorption peak curve of the test tablet is calculated, and then compared with the area under the absorption peak curve of the standard tablet whose concentration of the key active substances is known to obtain an area ratio; the concentration of key active substances of the notoginseng test sample is calculated according to the area ratio with the same amount of samples.

Further, in step 7), whether the position errors of absorption peak s are within the resolution range of the terahertz spectrograph should be determined.

The terahertz spectrograph used herein typically includes a light source, an aperture, an interferometer (a beam splitter, a movable mirror, a fixed mirror), a sample chamber, a detector, various reflectors, a laser, a control circuit board and a power source. The terahertz spectrograph is capable of qualitatively and quantitatively analyzing the samples, which is widely used in the pharmaceuticals and chemicals industry.

In the present invention, the time-domain graph of the background (without sample) and the notoginseng tablets prepared in a certain ratio are acquired. Then the time-domain graphs are transformed into frequency-domain graphs by Fourier transform, respectively. Fourier Transform refers to a mathematical operation that transforms a function (representing wave) of time (a time-domain representation showing the relationship between time and amplitude) to a function of frequency (frequency-domain representation showing the relationship between frequency and amplitude). Finally, the frequency-domain graphs of the notoginseng tablets and the background are converted by the equation $$Ab = -\log\left(\frac{Sam}{Ref}\right)$$

to obtain the absorption spectra data of the notoginseng samples. The test is repeated several times to obtain the absorption spectra data of the terahertz wave of the notoginseng samples in different thicknesses. By comparison, the optimal absorption spectra data are selected and collected for analysis of characteristic parameters of the notoginseng samples.

Criterion for determining the authenticity of a notoginseng medicine is obtained by comparing the absorption spectra of the notoginseng test sample and the notoginseng standard sample, which are achieved through the analysis of the absorption peak position and the closed area under the absorption peak curve. The test tablet and the standard tablet are prepared at the same amount. Firstly, the absorption peak position of the test tablet is compared with the absorption peak position of the standard tablet to determine whether the absorption peak position error is within the resolution range (usually 15 GHz) of the terahertz spectrograph. The area under the absorption peak curve of the test tablet is then calculated and compared with that of the standard tablet to determine whether the error is in the resolution range. If the above conditions are met, the authenticity of the notoginseng can be determined.

In theory, terahertz generally is able to detect the notoginseng materials. However, according to the previous tests, it is found that the concentration of the key active substances in the notoginseng is low and the absorption peak is extremely small. The identification results are unlikely to be obtained when an intact notoginseng, notoginseng slices, or notoginseng powder are detected directly by the terahertz spectrograph. The present invention enables qualitative and quantitative detection of the key active substances in the notoginseng samples. Specifically, the notoginseng sample powder and the polyethylene powder are mixed in a specified ratio. Then the absorption peak positions of the absorption spectra and the areas under the absorption peak curves are obtained. Finally, the absorption spectra of the key active substances in the notoginseng test sample and in the notoginseng standard sample are compared. The polyethylene powder is used herein to mix with the sample powder because: polyethylene is an odorless, non-toxic white powder with excellent chemical stability; and the terahertz wave is easily transmitted through polyethylene and will not adversely affect the absorption spectra of samples. The polyethylene is able to bind the samples so as to increase the sample strength to facilitate measurement, and the mixing ratio of can be easily adjusted. The polyethylene may be replaced by other odorless, non-toxic materials which have adhesion and the terahertz wave is easily transmitted. The ratio of notoginseng powder to polyethylene powder is set to 1:4-1:6 because there are two opposed factors of characteristic absorption and loss when terahertz wave passes through the samples. The characteristic absorption spectra of the samples can only be detected with proportional notoginseng and polyethylene powder. When the proportion of the sample is too low (<1:6), the characteristic absorption is not obvious, and the detected absorption peak signal is too weak to be effectively identified. If the proportion of the sample is too high (>1:4), the signal noise is large and the characteristic absorption spectra cannot be effectively identified. For the above reasons, the finally determined ratio is set to 1:4-1:6 to achieve effective identification and detection.

As compared to the existing technologies, the present invention achieves a remarkable technical progress. Here, the terahertz technology is utilized to detect the notoginseng samples, and the whole operation process is easy and simple and involves convenient observation and high efficiency, which is suitable for bulk detection. The completion of the entire process usually takes only a few minutes, which is much faster than the traditional test period of at least a few days to a few weeks.

The present invention prevents the fake and adulterated notoginseng from the market, thus ensuring people's health and solving the problem that the existing medicine is incapable of quantitative and bulk detection. In addition, only a small amount of notoginseng powder is required for detection, which will not cause damage to raw materials.

DETAILED DESCRIPTION OF EMBODIMENTS

The present disclosure will be further described below with reference to the embodiments. These embodiments are only for illustration, and have no intention to limit the invention. Steps that not be specifically described in the examples are existing technology so no details will be described here. Based on the examples in the invention, all other embodiments without any creative efforts obtained by those skilled in the art are within the scope of the present invention.

Example 1

The present invention provides a method for detecting notoginseng using terahertz technology. The method is able to quickly, cost-effectively and easily identify authenticity of the notoginseng medicine in the market and obtain a concentration of the key active substances.

Instruments and samples: terahertz spectrograph, electronic scale, pulverizer, tablet press, grinding dish; notoginseng sample (originating from Yunnan), polyethylene powder (PE).

Preparation of Standard notoginseng

A standard product of Yunnan notoginseng sample was randomly selected and pulverized in the pulverizer. An appropriate amount of the pulverized notoginseng powder is weighed by the electronic scale. The pulverized notoginseng powder is mixed with an appropriate amount of polyethylene powder in the grinding dish. The ratio of notoginseng powder to polyethylene powder must be set to 1:4-1:6. Then, the obtained powder mixture is pressed in the tablet press by applying a force of 3 tons for 3 minutes to obtain a standard tablet for detection. A terahertz spectrum test is performed using the terahertz spectrograph. Specific steps are described below.

1) The humidity in the sample chamber of a terahertz spectrograph was reduced to less than 3%. The spectra of tablets were stored and a single channel of background was measured. A time-domain graph of the background (without sample) was acquired.

2) The standard tablet and the test tablet were placed on a sample holder. A time-domain graph of the standard tablet was acquired.

3) The time-domain graphs were transformed into frequency-domain graphs by Fourier transform.

Figure 1:
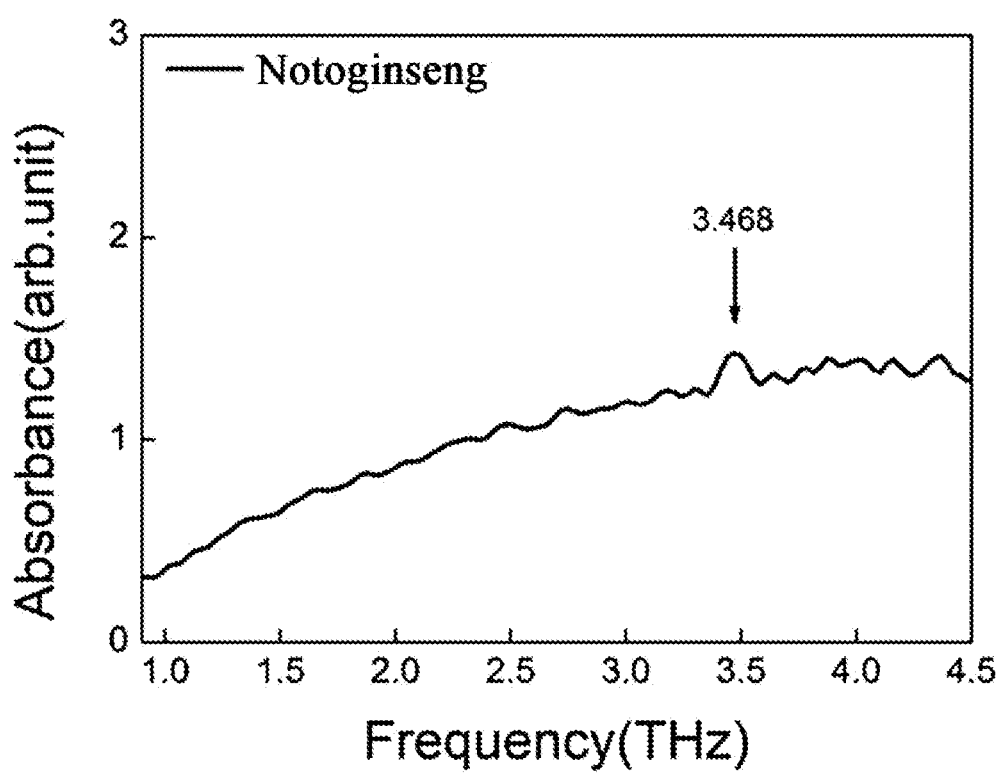
FIG. 1 is an absorption spectrum of notoginseng detected according to the method of the present invention, where the ratio of notoginseng powder to polyethylene powder is 1:5.

4) The frequency-domain graphs of the standard tablet and the background were converted into absorption spectra of the standard tablet (as shown in FIG. 1) by the following equation:

$$Ab = -\log\left(\frac{Sam}{Ref}\right);$$

where, Ab was the absorption spectrum data, Sam was the frequency-domain data of the standard tablet and the test tablet, and Ref was the reference frequency-domain data.

5) A test tablet of notoginseng sample to be detected was prepared. The test was repeated to obtain multiple sets of absorption spectrum data of the test tablet. The obtained multiple sets of the absorption spectra data were averaged. using analysis software to draw the spectral graphs of the standard sample tablet and the test sample tablet; comparing the peaks' position, which determine whether the sample is a real notoginseng.

6) After determining that the sample is the real notoginseng, the concentration of key active substances of the test tablet was quantitatively analyzed by integrating the area under the absorption peaks in the spectrum corresponding to the key active substance. The area under the absorption peak curve of the test tablet was calculated, and then compared with an area under an absorption peak curve of the standard tablet whose concentration of the key active substances was known to obtain an area ratio. The concentration of key active substances of the notoginseng test sample was calculated according to the area ratio with the same amount of samples. It should be noted that the ratio of the test notoginseng powder to the polyethylene powder must be the same as the ratio of the standard notoginseng powder to the polyethylene powder, otherwise the test would be inaccurate. Moreover, the ratio of the samples to the polyethylene powder was fixed; that is, the concentration of notoginseng sample to be detected is fixed.

FIG. 1 is an absorption spectrum of notoginseng detected when the ratio of the notoginseng powder to the polyethylene powder is 1:5 according to the method of the present invention.

Figure 2:
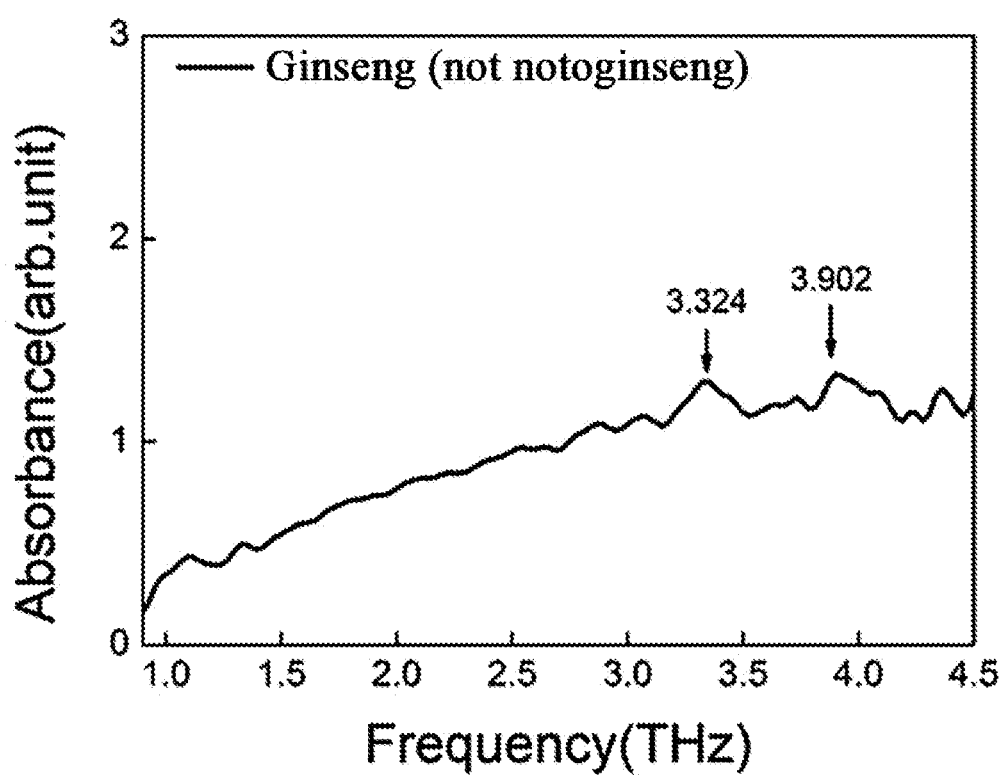
FIG. 2 is an absorption spectrum of ginseng (which is not notoginseng) detected according to the method of the present invention.

As shown in FIG. 2, the ginseng was tested by the above method. It is found that the absorption peak position of the spectrum of ginseng (not notoginseng) is not the same as that of notoginseng. The difference between the absorption peak positions can be used as an identification basis of notoginseng.

Figure 3:
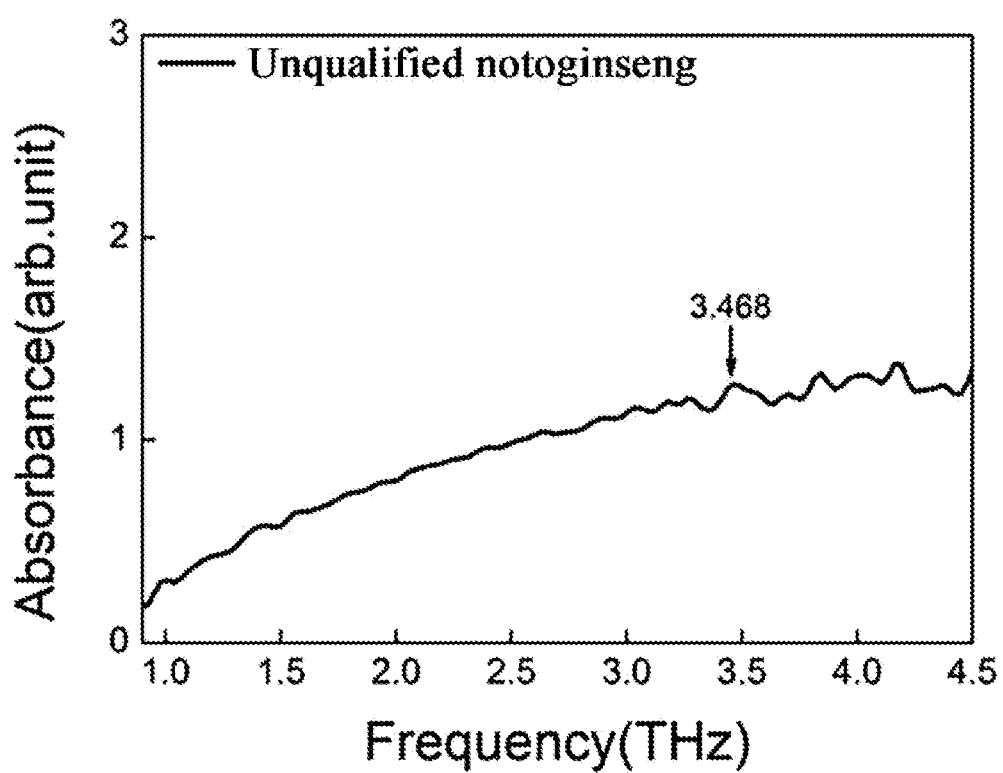
FIG. 3 is an absorption spectrum of unqualified notoginseng detected according to the method of the present invention.

As shown in FIG. 3, an unqualified notoginseng was tested by the above method. Although the absorption peak of the spectrum of the unqualified notoginseng can also be detected, it is lower than that of the real notoginseng, and the closed area under the absorption peak curve of the unqualified notoginseng is small. This can be used as a indicator for determining whether notoginseng is qualified or not, and whether it is doped with impurities.

Figure 4:
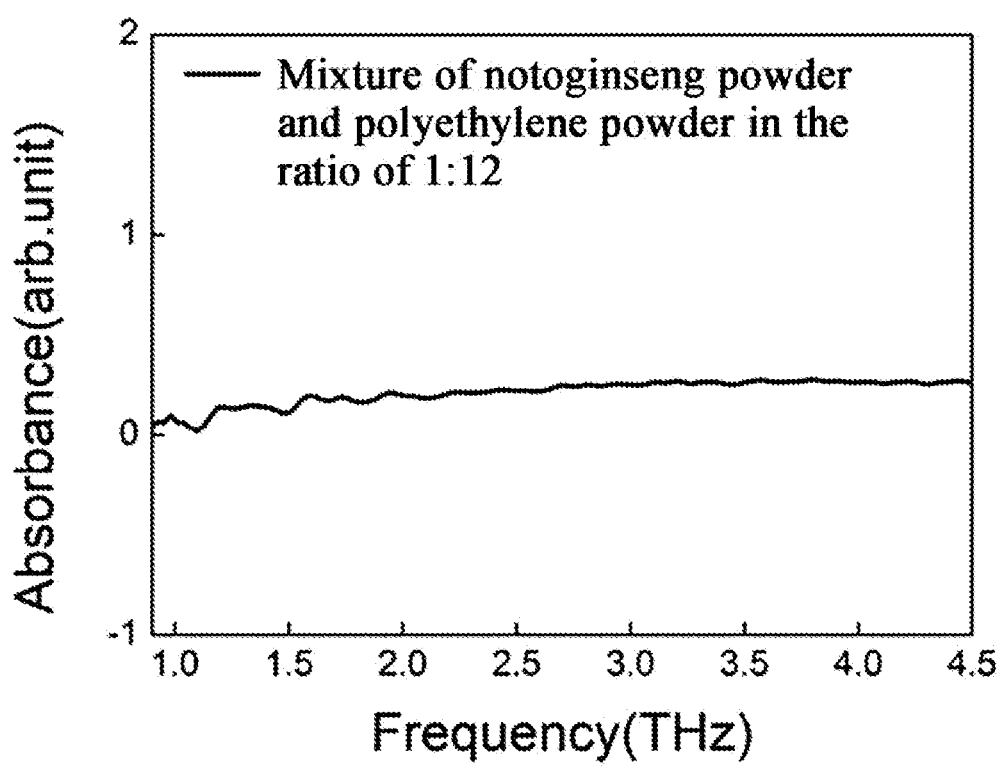
FIG. 4 is an absorption spectrum of notoginseng detected according to the method of the present invention, where the ratio of notoginseng powder to polyethylene powder is 1:12.
Figure 5:
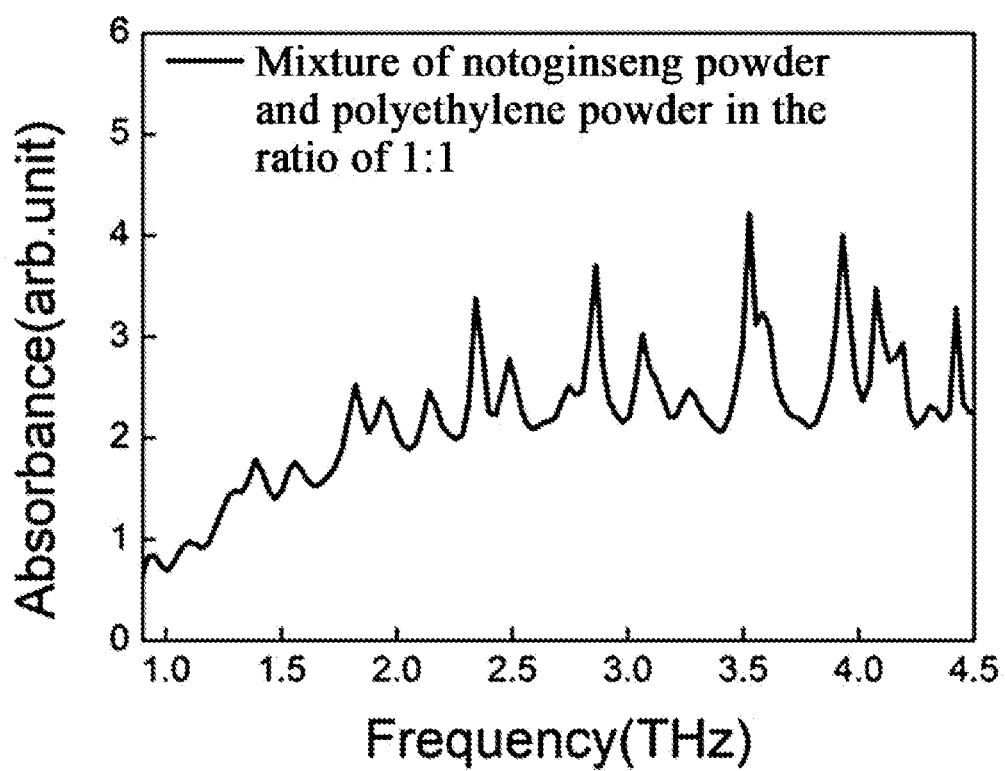
FIG. 5 is an absorption spectrum of notoginseng detected according to the method of the present invention, where the ratio of notoginseng powder to polyethylene powder is 1:1.

FIGS. 4 and 5 are absorption spectra of notoginseng when the ratio of the notoginseng powder and the polyethylene powder does not fall between 1:4 and 1:6. It can be seen that if the proportion of the sample is too low (<1:6), the absorption spectra curve is nearly a straight line; that is, the absorption peak is not obvious. Thus, it is impossible to effectively identify the notoginseng sample. However, if the proportion of the sample is too high (>1:4), the signal noise will be large and the absorption spectra of notoginseng will not be recognized effectively.

If FIG. 1 is used as a standard, the ratio of the notoginseng powder to the polyethylene powder must be the same as the embodiment shown in FIG. 1.

It should be understood that for those of ordinary skills in the market, improvements or variations can be made based on the above descriptions, and such improvements and variations fall within the scope of the appended claims.

The embodiments are only illustrative of the present disclosure, and apparently the implementations are not limited by the above modes. The embodiments described herein and various modifications based on the ideas and technical solutions of the present disclosure fall within the scope of the present application.

What is claimed is:

1. A method for detecting notoginseng using terahertz technology, comprising:
   1) pulverizing a notoginseng standard sample and a notoginseng test sample separately in a pulverizer; then mixing the pulverized standard sample and the pulverized test sample respectively with a polyethylene powder with the same ratio of between 1:4 and 1:6 to obtain a standard powder mixture and a test powder mixture;
   2) pressing the standard powder mixture and the test powder mixture separately in a tablet press to obtain a standard tablet and a test tablet for detection;

3) reducing humidity in a sample chamber of a terahertz spectrograph to less than 3%; storing a peak position; measuring a single channel of background; and acquiring a time-domain graph of the background without sample;
4) placing the standard tablet and the test tablet on a sample holder successively;
acquiring a time-domain graph of the standard tablet and a time-domain graph of the test tablet, respectively;
5) transforming the time-domain graphs of the background, the standard tablet and the test tablet into frequency-domain graphs by Fourier transform;
6) converting the frequency-domain graphs of the standard tablet, the test tablet and the background to obtain absorption spectra of the standard tablet and the test tablet by the following equation:

$$Ab = -\log\left(\frac{Sam}{Ref}\right);$$

where, Ab is the absorption spectrum data, Sam is the standard frequency-domain data, and Ref is the reference frequency-domain data;
7) repeating test to obtain multiple sets of absorption spectrum data of the test tablet; averaging the obtained multiple sets of the absorption spectrum data; comparing an absorption spectrum of the test tablet obtained by analysis software according to the averaged absorption spectrum data with that of the standard tablet, wherein a comparison between absorption peak positions of the test tablet and absorption peak position of the standard tablet are made to determine authenticity of the notoginseng test sample; wherein, when position errors of absorption peak of the test notoginseng tablet are within a resolution range of the terahertz spectrograph, the notoginseng sample is authentic, otherwise it is fake notoginseng;
8) when it is determined that the test sample is authentic, quantitatively analyzing a concentration of key active substances of the test tablet by integrating an area under an absorption peak curve of the tablet notoginseng test sample; wherein the area under the absorption peak curve of the test tablet is calculated, and then compared with an area under an absorption peak curve of the standard tablet whose concentration of the key active substances is known to obtain an area ratio; the concentration of key active substances of the notoginseng test sample is calculated according to the area ratio with the same amount of samples.

2. The method of claim 1, wherein in step 7), whether the position errors of absorption peak are within the resolution range of the terahertz spectrograph is further determined.

* * * * *